(12) United States Patent
Ghigliotty et al.

(10) Patent No.: US 11,286,789 B2
(45) Date of Patent: Mar. 29, 2022

(54) FILM COOLING DIFFUSER HOLE

(71) Applicant: RAYTHEON TECHNOLOGIES CORPORATION, Farmington, CT (US)

(72) Inventors: Jaime G Ghigliotty, Cabo Rojo, PR (US); David J Candelori, Glastonbury, CT (US); San Quach, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/920,014

(22) Filed: Jul. 2, 2020

(65) Prior Publication Data

US 2022/0003119 A1    Jan. 6, 2022

(51) Int. Cl.
| | |
|---|---|
| *F01D 5/18* | (2006.01) |
| *F01D 25/12* | (2006.01) |

(52) U.S. Cl.
CPC .............. *F01D 5/186* (2013.01); *F01D 25/12* (2013.01); *F05D 2230/90* (2013.01); *F05D 2240/12* (2013.01); *F05D 2240/14* (2013.01); *F05D 2240/35* (2013.01); *F05D 2250/12* (2013.01); *F05D 2260/202* (2013.01)

(58) Field of Classification Search
CPC ...... F01D 5/186; F01D 25/12; F05D 2250/12; F05D 2260/202
See application file for complete search history.

(56) References Cited

U.S. PATENT DOCUMENTS

| | | |
|---|---|---|
| 2013/0206739 A1 | 8/2013 | Reed et al. |
| 2013/0209234 A1 | 8/2013 | Xu |
| 2013/0209235 A1 | 8/2013 | Xu |
| 2014/0161585 A1* | 6/2014 | Arness ............... F01D 5/288 415/1 |
| 2016/0090843 A1 | 3/2016 | Albert et al. |
| 2019/0085705 A1* | 3/2019 | Webster ............... F01D 9/02 |
| 2020/0024951 A1 | 1/2020 | Herman et al. |

FOREIGN PATENT DOCUMENTS

EP          985802         10/2003

OTHER PUBLICATIONS

European Patent Office, European Search Report dated Oct. 28, 2021 in Application No. 21171030.6.

* cited by examiner

*Primary Examiner* — Eldon T Brockman
(74) *Attorney, Agent, or Firm* — Snell & Wilmer L.L.P.

(57) ABSTRACT

An airfoil for a gas turbine engine is disclosed. In various embodiments, the airfoil includes a cooling passage; an outer wall separating a core flow path from the cooling passage; a diffuser in fluid communication with the cooling passage and opening into the core flow path, the diffuser being characterized by a linear ridge on a downstream end of the diffuser; and a thermal barrier coating covering the outer wall and the linear ridge.

18 Claims, 4 Drawing Sheets

FILM COOLING DIFFUSER HOLE

GOVERNMENT LICENSE RIGHTS

This disclosure was made with government support under contract N00019-18-C-1021 (Lot 12-14), awarded by the United Stated Air Force. The government has certain rights in the disclosure.

FIELD

The present disclosure relates to gas turbine engines and, more particularly, to systems and methods used to cool airfoils within gas turbine engines.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section.

Turbine section components, such as turbine blades and vanes, are operated in high temperature environments. To avoid deterioration in the components resulting from their exposure to high temperatures, cooling circuits are typically employed within the components. Turbine blades and vanes are subjected to high thermal loads on both the suction and pressure sides of the airfoil portions and at both the leading and trailing edges. The regions of the airfoils having the highest thermal loads can differ depending on engine design and specific operating conditions.

Minicore technology offers the potential to provide higher specific cooling passages for turbine components such as blade and vane airfoils, blade outer air seals and combustor or gas path panels. Minicore technology typically employs refractory metal cores to allow cooling circuits to be placed just under the surface of the hot wall through which cooling air flows before being expelled into the gas path. State of the art cooling circuits made using investment casting techniques and refractory metal cores may, however, contain defects or artifacts following manufacture. One such defect or artifact is a linear ridge that can form at the exit portion of a diffuser hole connected to the minicore. The linear ridge may, however, disrupt the smooth flow of air as it passes out of the diffuser hole and into in the main gas path. In order to prevent such flow disruption, additional fabrication steps are typically required to remove the linear ridge, resulting in increased time required and cost incurred during the fabrication of the turbine components.

SUMMARY

An airfoil for a gas turbine engine is disclosed. In various embodiments, the airfoil includes a cooling passage; an outer wall separating a core flow path from the cooling passage; a diffuser in fluid communication with the cooling passage and opening into the core flow path, the diffuser being characterized by a linear ridge on a downstream end of the diffuser; and a thermal barrier coating covering the outer wall and the linear ridge.

In various embodiments, the diffuser defines a rectangular shape in a direction normal to the outer wall. In various embodiments, the linear ridge extends perpendicular to the cooling passage along the downstream end of the diffuser. In various embodiments, the thermal barrier coating includes a first portion upstream of the linear ridge, the first portion extending from the cooling passage and being characterized by a first radius of curvature. In various embodiments, the thermal barrier coating includes a second portion, the second portion extending from the first portion and over the linear ridge and being characterized by a second radius of curvature. In various embodiments, the thermal barrier coating is configured to transition from the first portion to the second portion at an inflection line.

In various embodiments, the linear ridge includes an upstream facing side that is characterized by a height, the height having a value within a range of between five one-hundredths and seventy-five one-hundredths of a depth of the cooling passage. In various embodiments, the diffuser includes an upstream wall, the upstream wall extending from the cooling passage to the outer wall and being characterized by a third radius of curvature, the third radius of curvature being greater than the depth of the cooling passage.

In various embodiments, the thermal barrier coating includes a first portion upstream of the linear ridge, the first portion extending from the cooling passage and being characterized by a first radius of curvature, the first radius of curvature being greater than the third radius of curvature. In various embodiments, the thermal barrier coating includes a second portion, the second portion extending from the first portion and over the linear ridge and being characterized by a second radius of curvature, the second radius of curvature being less than the first radius of curvature. In various embodiments, the thermal barrier coating is configured to transition from the first portion to the second portion at an inflection line. In various embodiments, the first portion of the thermal barrier coating extends into the diffuser a distance equal to about twice the depth of the cooling passage.

A component for a gas turbine engine is disclosed. In various embodiments, the component includes a cooling passage; an outer wall separating a core flow path from the cooling passage; a minicore exit aperture in fluid communication with the cooling passage and opening into the core flow path, the minicore exit aperture being characterized by a linear ridge on a downstream end of the minicore exit aperture; and a thermal barrier coating covering the outer wall and the linear ridge.

In various embodiments, the minicore exit aperture defines a rectangular shape in a direction normal to the outer wall and the linear ridge extends perpendicular to the cooling passage along the downstream end of the minicore exit aperture. In various embodiments, the thermal barrier coating includes a first portion upstream of the linear ridge, the first portion extending from the cooling passage and being characterized by a first radius of curvature and the thermal barrier coating includes a second portion, the second portion extending from the first portion and over the linear ridge and being characterized by a second radius of curvature.

In various embodiments, the thermal barrier coating is configured to transition from the first portion to the second portion at an inflection line. In various embodiments, the linear ridge includes an upstream facing side that is characterized by a height, the height having a value within a range of between five one-hundredths and seventy-five one-hundredths of a depth of the cooling passage. In various embodiments, the minicore exit aperture includes an upstream wall, the upstream wall extending from the cooling passage to the outer wall and being characterized by a third radius of curvature, the third radius of curvature being greater than the depth of the cooling passage. In various embodiments, the first radius of curvature is greater than the third radius of curvature. In various embodiments, the second radius of curvature is less than the first radius of curvature.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
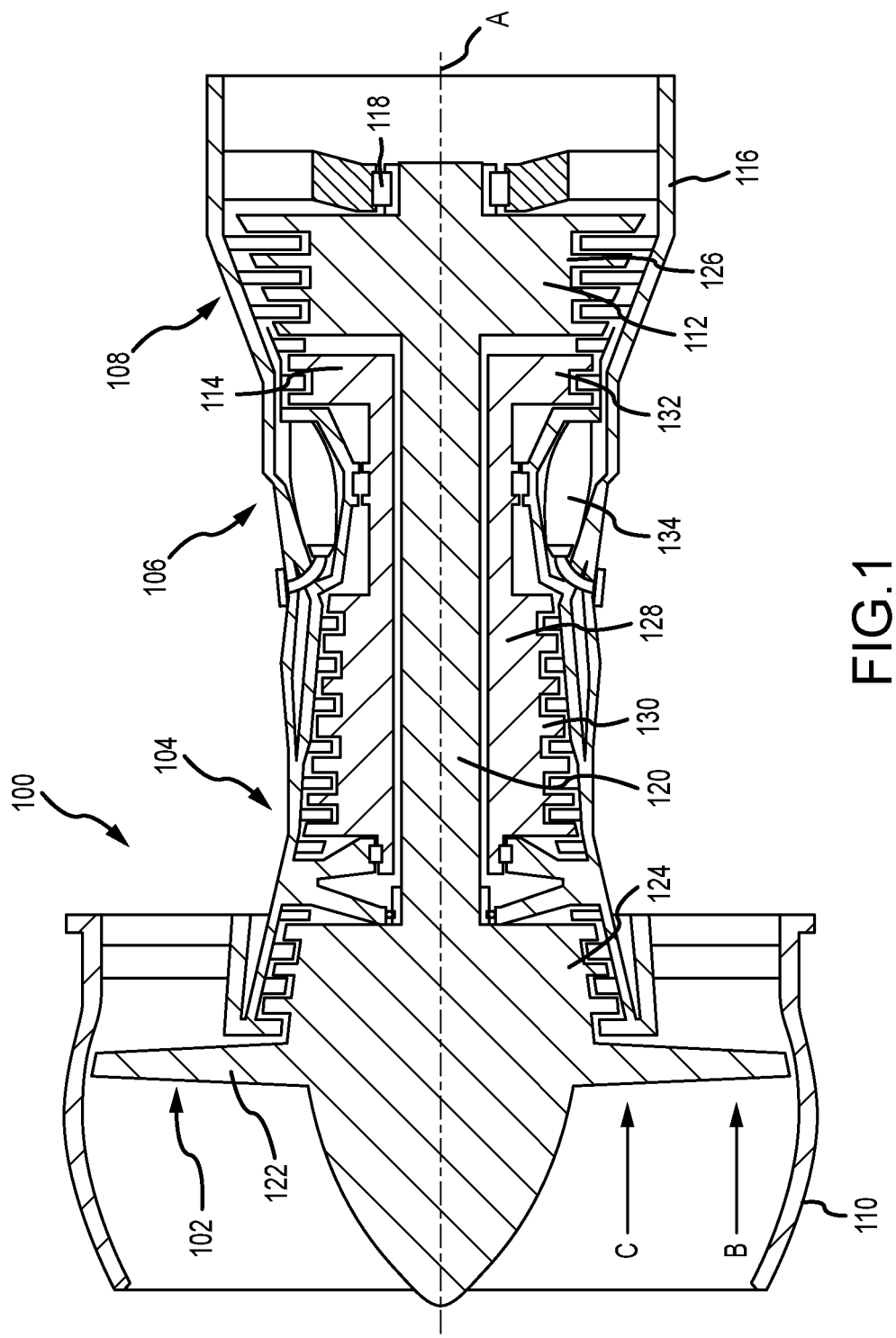
FIG. 1 is a schematic representation of a gas turbine engine, in accordance with various embodiments.

Referring now to the drawings, FIG. 1 schematically illustrates a gas turbine engine 100, in accordance with various embodiments. The gas turbine engine 100 is disclosed herein as a two-spool turbofan that generally incorporates a fan section 102, a compressor section 104, a combustor section 106 and a turbine section 108. The fan section 102 drives air along a bypass flow path B in a bypass duct defined within a nacelle 110, while the compressor section 104 drives air along a primary or core flow path C for compression and communication into the combustor section 106 and then expansion through the turbine section 108. Although depicted as a two-spool turbofan gas turbine engine in the disclosed non-limiting embodiment, it will be understood that the concepts described herein are not limited to use with two-spool turbofans, as the teachings may be applied to other types of gas turbine engines, including, for example, architectures having three or more spools or only a single spool.

The gas turbine engine 100 generally includes a low speed spool 112 and a high speed spool 114 mounted for rotation about an engine central longitudinal axis A relative to an engine static structure 116 via several bearing systems 118. It should be understood that various bearing systems at various locations may alternatively or additionally be provided and the location of the several bearing systems 118 may be varied as appropriate to the application. The low speed spool 112 generally includes an inner shaft 120 that interconnects a fan 122, a low pressure compressor 124 and a low pressure turbine 126. The inner shaft 120 may be directly connected to the fan 122 or through a speed change mechanism, such as, for example, a fan drive gear system configured to drive the fan 122 at a lower speed than that of the low speed spool 112. The high speed spool 114 generally includes an outer shaft 128 that interconnects a high pressure compressor 130 and a high pressure turbine 132. A combustor 134 is arranged in the gas turbine engine 100 between the high pressure compressor 130 and the high pressure turbine 132. The inner shaft 120 and the outer shaft 128 are concentric and rotate via the several bearing systems 118 about the engine central longitudinal axis A, which is collinear with longitudinal axes of the inner shaft 120 and the outer shaft 128.

The air in the core flow path C is compressed by the low pressure compressor 124 and then the high pressure compressor 130, mixed and burned with fuel in the combustor 134, and then expanded over the high pressure turbine 132 and the low pressure turbine 126. The low pressure turbine 126 and the high pressure turbine 132 rotationally drive the respective low speed spool 112 and the high speed spool 114 in response to the expansion. It will be appreciated that each of the positions of the fan section 102, the compressor section 104, the combustor section 106, the turbine section 108, and the fan drive gear system, if present, may be varied. For example, the fan drive gear system may be located aft of the combustor section 106 or even aft of the turbine section 108, and the fan section 102 may be positioned forward or aft of the location of the fan drive gear system.

Figure 2A:
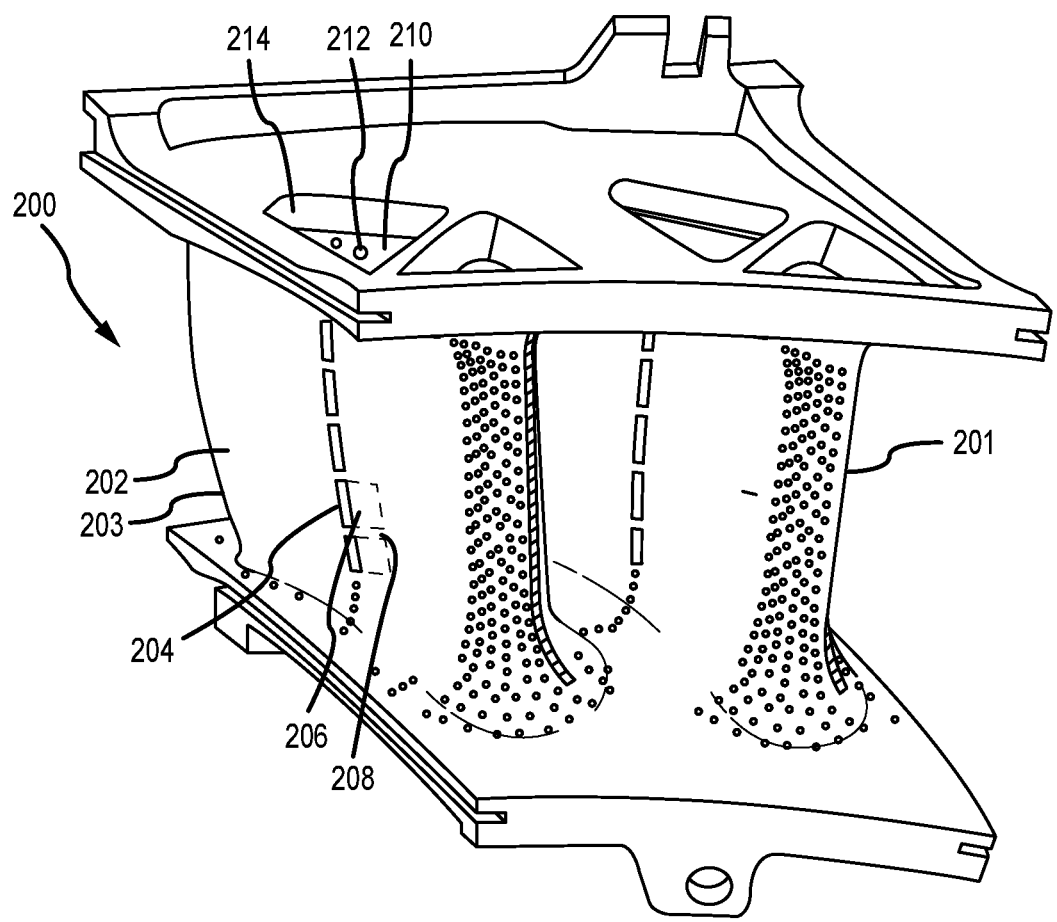
FIG. 2A is a schematic representation of a pair of turbine vanes from the turbine section of FIG. 1, in accordance with various embodiments.

Referring now to FIG. 2A, a pair of turbine vanes 200 (e.g., a first turbine vane 201 and a second turbine vane 203) are schematically illustrated. The pair of turbine vanes 200 are representative of the vanes present in either of the low pressure turbine 126 and the high pressure turbine 132 described above with reference to FIG. 1. While the present disclosure will be described with respect to its application to a turbine vane, the disclosure could also be utilized in a rotating structure such as a turbine blade (e.g., the turbine blades present in either of the low pressure turbine 126 and the high pressure turbine 132) or other static turbine components such as blade outer air seals, turbine exhaust cases and struts. Additional uses of the cooling scheme may include combustor liners and flame holders as well as nozzle liners and flaps. In various embodiments, each of the pair of turbine vanes 200 includes an outer wall 202 through which are formed minicore slots or exit apertures 204 for exhausting a cooling air (or other fluid) from a plurality of minicores 206 formed in the outer wall 202 of each of the pair of turbine vanes 200. Between adjacent pairs of minicores is a rib or a web 208. A baffle 210 having a plurality of baffle apertures 212 formed therethrough is disposed within each of the pair of turbine vanes 200. Each of the pair of turbine vanes 200 also includes a baffle inlet 214 at a radial end. The baffle apertures 212 are arranged and positioned in order to direct a cooling fluid CF directly onto the web 208, and are sized in order to allow sufficient fluid flow to fill the plurality of minicores 206.

Figure 2B:
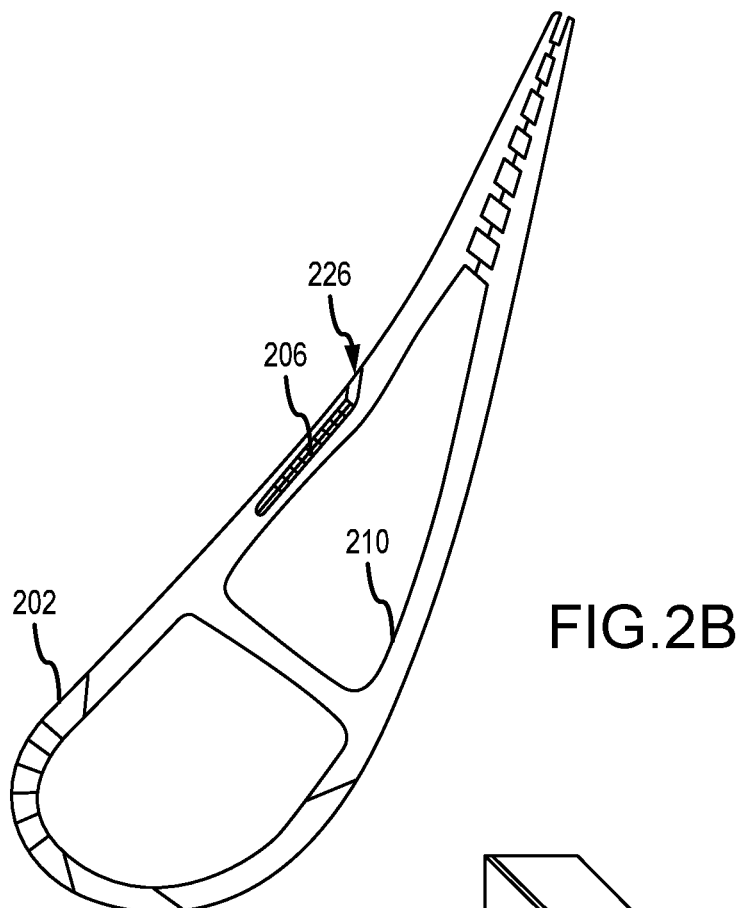
FIG. 2B is a sectional view of one of the pair of turbine vanes illustrated in FIG. 2A, in accordance with various embodiments.
Figure 2C:
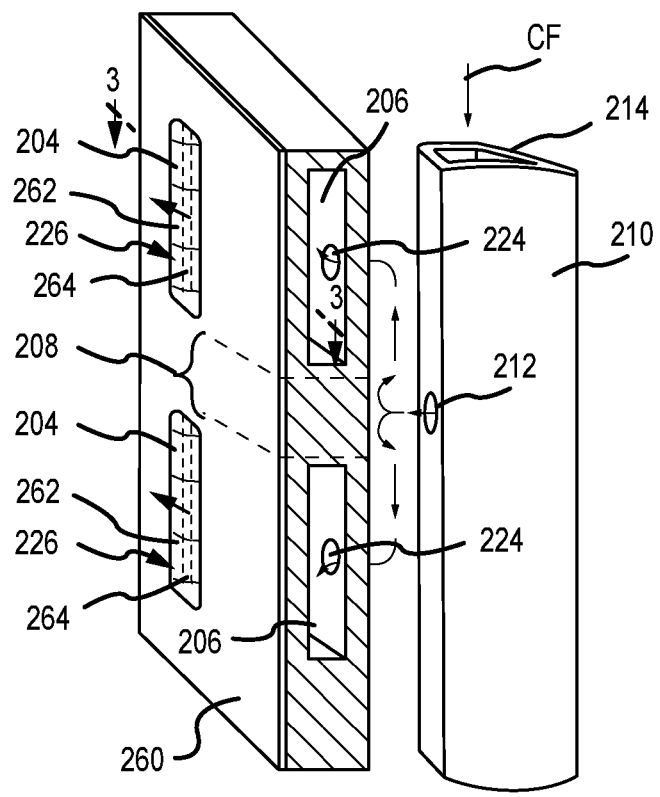
FIG. 2C is a perspective view of a baffle and a pair of minicores inside one of the pair of turbine vanes illustrated in FIG. 2A, in accordance with various embodiments.

Referring now to FIG. 2B, with continued reference to FIG. 2A, a sectional view through one of the pair of turbine vanes 200 is illustrated. The plurality of minicores 206 (e.g., a first minicore 220 and a second minicore 222) is formed in the outer wall 202 of each of the pair of turbine vanes 200. The baffle 210 is disposed inside each of the pair of turbine vanes 200, and spaced inwardly of the outer wall 202. Referring now to FIG. 2C, with continued reference to FIGS. 2A and 2B, operation of the baffle 210 and each of the plurality of minicores 206 inside the pair of turbine vanes 200 is described. The cooling fluid CF (e.g., a high-pressure flow of air bled from the compressor section 104 of the gas turbine engine 100 described above with reference to FIG. 1), is directed into the baffle inlet 214 of the baffle 210. The cooling fluid CF is then directed from the baffle apertures 212 through the baffle 210 and directly onto the web 208 in the outer wall 202 between adjacent pairs of the plurality of minicores 206. The cooling fluid CF then flows into each of the plurality of minicores 206 through a minicore inlet aperture 224. Inside each of the plurality of minicores 206, the cooling fluid CF flows generally parallel to an outer surface of the outer wall 202 before being exhausted through a minicore exit aperture 226 associated with each of the plurality of minicores 206. Although each of the plurality of minicores 206 is shown having a single minicore inlet aperture and a single minicore exit aperture, each of the plurality of minicores 206 could have a plurality of minicore inlet apertures or a plurality of minicore exit apertures. The dimensions and spacing of the baffle apertures 212 (one shown) are such that the heat transfer coefficients generated provide a heat flux that is comparable to that achieved by each of the plurality of minicores 206. As a result, the outer wall 202 exhibits lower overall thermal gradients, which tends to reduce thermal mechanical fatigue and increase oxidation life by lowering peak surface temperatures. As illustrated in FIG. 2C, and as described in more detail below with reference to FIG. 3, a linear ridge 262 that extends laterally across the minicore exit aperture 226 and has an upstream facing face 264 may be formed during fabrication of the turbine vane and, in various embodiments, is employed to help anchor a thermal barrier coating 260 following fabrication.

Figure 3:
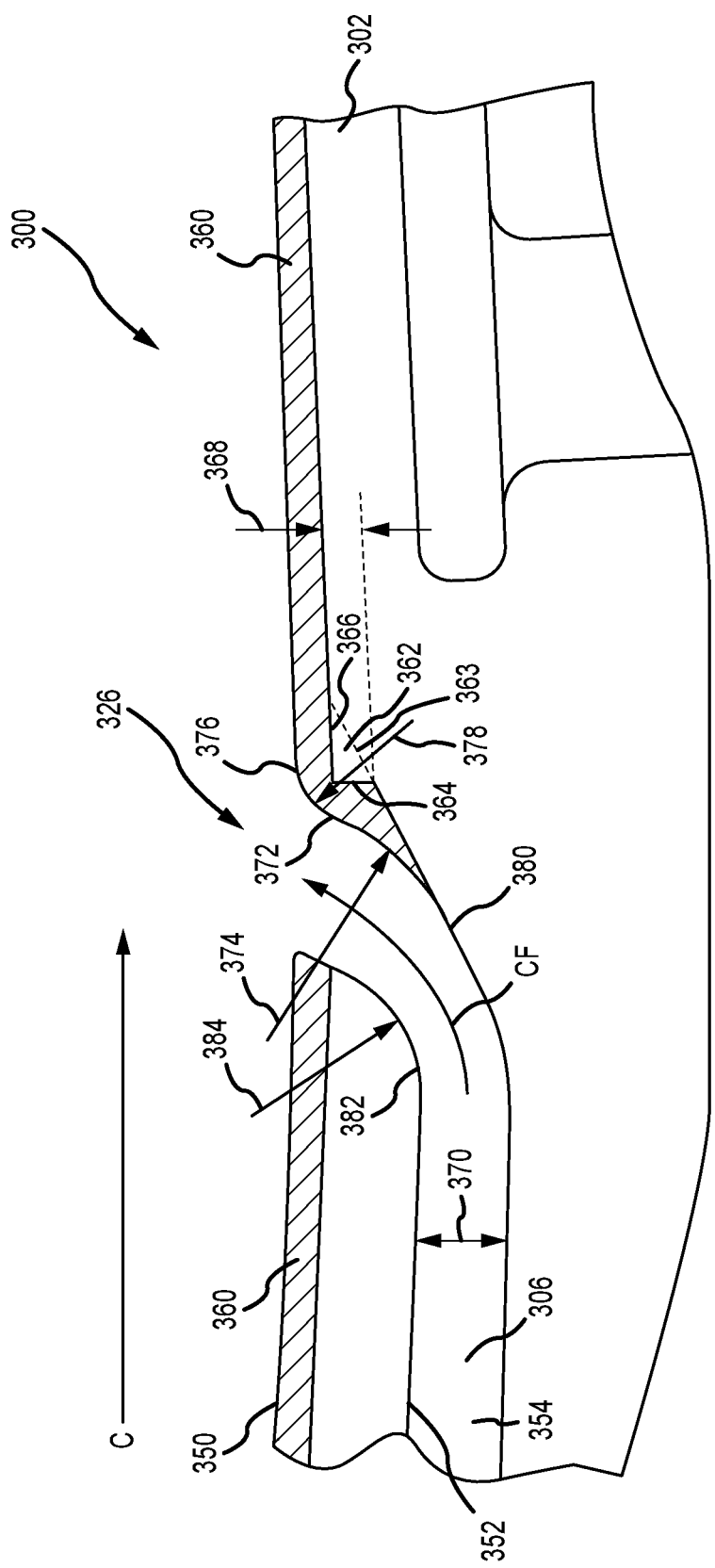
FIG. 3 is a cross sectional view of a minicore exit aperture, in accordance with various embodiments.

Referring now to FIG. 3, a cross-sectional view of a portion of a turbine vane 300 (e.g., one of the pair of turbine vanes 200 described above with reference to FIGS. 2A-2C) is illustrated. The turbine vane 300 includes a minicore 306 having a minicore exit aperture 326 opening from an outer wall 302 of the turbine vane 300 and into a core flow path C. In various embodiments, the outer wall 302 defines a hot side surface 350 in contact with the core flow path C and a cold side surface 352 that faces a cooling fluid CF. In various embodiments, the cold side surface 352 can form a portion of a cooling passage 354 of the minicore 306. In various embodiments, the minicore exit aperture 326 forms a diffuser in fluid communication with the cooling passage 354, the diffuser having a rectangular shape in a direction normal to the outer wall 302. In various embodiments, a thermal barrier coating 360 is applied to the outer wall 302 at locations both upstream and downstream of the minicore exit aperture 326, with the outer surface of the thermal barrier coating forming the hot side surface 350. In various embodiments, the thermal barrier coating 360 may comprise, for example, a coating having yttria-stabilized zirconia, ytterbium zirconium, fully-stabilized gadolinia zirconia, alumina, pyrochlores, or combinations thereof. In various embodiments, the coating further includes a bonding layer, for example, a MCrAlY alloy (where M identifies one or more of Fe, Ni, and Co), intermetallic aluminide, or any other suitable material. The coating may be applied to the outer wall 302 by any suitable process, such as, for example, physical vapor deposition, chemical vapor deposition, cold spray, or a combination thereof.

As described previously, during fabrication of the turbine vane 300, a defect or an artifact in the form of a linear ridge 362 (or a slot exit ridge) can form along the exit portion, generally perpendicular to the cooling passage 354 or to the flow of the cooling fluid CF through the cooling passage 354 at a downstream end of the minicore exit aperture 326. In various embodiments, the linear ridge 362 includes an upstream facing side 364 that is generally perpendicular to the hot side surface 350 and an outer wall side 366 that is generally parallel to and contiguous with the outer surface of the outer wall 302. Rather than machine the ridge away to improve the flow aerodynamics of the cooling fluid CF as it exits the minicore exit aperture 326, the thermal barrier coating 360 is applied to the outer wall 302 to cover both the outer surface of the outer wall 302 and the linear ridge 362, with the linear ridge 362 helping to anchor the thermal barrier coating 360 in the vicinity of the minicore exit aperture 326. In various embodiments, the linear ridge 362 may result as a defect or an artifact from the casting process or may be intentionally incorporated into the design of the casting process. Without the linear ridge 362 being present, a continuous slope 363 would transition a downstream wall 380 of the minicore exit aperture 326 to the outer wall 366.

Still referring to FIG. 3, in various embodiments, the upstream facing side 364 of the ridge 362 is characterized by a height 368 (H). The height 368 may be further characterized in relation to a depth 370 (D) of the cooling passage 354. For example, in various embodiments, the height 368 may be configured within a range such that $0.05D<H<0.75D$; or, in various embodiments, the height 368 may be configured within a range such that $0.10D<H<0.65D$; or, in various embodiments, the height 368 may be configured within a range such that $H \approx 0.50D$. Further, in various embodiments, the geometry of the ridge, as described above, facilitates incorporation of a first portion 372 of the thermal barrier coating 360 characterized by a first radius of curvature 374 ($R_1$). The first portion 372 merges smoothly, through an inflection point (or an inflection line extending along a width of the minicore exit aperture), with a second portion 376 of the thermal barrier coating 360 that is characterized by a second radius of curvature 378 ($R_2$) that is typically less than the first radius of curvature 374. In various embodiments, for example, $R_1>10R_2$; or, in various embodiments, $R_1>5R_2$; or, in various embodiments, $R_1 \approx 2R_2$. The smooth transition between the first portion 372 and the second portion 376 facilitates smooth flow of the cooling fluid CF along the thermal barrier coating 360, which extends a distance of between about 1D and about 2D into the minicore exit aperture 326 along the downstream wall 380 of the aperture. In various embodiments, an upstream wall 382 of the minicore exit aperture 326 is characterized by a third radius of curvature 384 ($R_3$). The third radius of curvature 384 also facilitates smooth flow of the cooling fluid CF along the upstream wall 382 as the cooling fluid CF exits the minicore exit aperture 326. In various embodiments, the third radius of curvature 384 is configured such that, for example, $R_3 > 3D$; or, in various embodiments, $R_3 > 2D$; or, in various embodiments, $R_3 \approx D$. In addition, in order to configure the minicore exit aperture 326 as a diffuser, $R_1$ will generally be greater than $R_3$, such that, for example, in various embodiments, $R_1 > 5R_3$; or, in various embodiments, $R_1 > 3R_3$; or, in various embodiments, $R_1 \approx 2R_3$.

The above disclosure provides improved manufacturability and reproducibility of casted components (e.g., airfoils of rotors or stators or guide vanes) having film cooling diffuser exits. The disclosure is particularly applicable to such components having ridge defects at a downstream end of the diffuser exit, where the ridge defects result from the casting process, and obviates the need to machine away or otherwise remove the defect prior to completing further steps in the fabrication process, such as, for example, applying a thermal barrier coating, thereby reducing manufacturing cost. The dimensional ranges described above also result in enhanced adherence of the film cooling fluid to the surface of the component (e.g., a reduction in the tendency for the cooling fluid to blow off the surface of the component).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An airfoil for a gas turbine engine, comprising:
   a cooling passage;
   an outer wall separating a core flow path from the cooling passage;
   a diffuser in fluid communication with the cooling passage and opening into the core flow path, the diffuser being characterized by a linear ridge on a downstream end of the diffuser; and
   a thermal barrier coating covering the outer wall and the linear ridge,
      wherein the linear ridge includes an upstream facing side that is characterized by a height extending a first distance in a direction normal to the outer wall, the height having a value within a range of between five one-hundredths and seventy-five one-hundredths of a depth of the cooling passage, the depth extending between a first wall and a second wall that define the cooling passage and in the direction normal to the outer wall.

2. The airfoil of claim 1, wherein the diffuser defines a rectangular shape in the direction normal to the outer wall.

3. The airfoil of claim 2, wherein the linear ridge extends perpendicular to the cooling passage along the downstream end of the diffuser.

4. The airfoil of claim 3, wherein the thermal barrier coating includes a first portion upstream of the linear ridge, the first portion extending from the cooling passage and being characterized by a first radius of curvature.

5. The airfoil of claim 4, wherein the thermal barrier coating includes a second portion, the second portion extending from the first portion and over the linear ridge and being characterized by a second radius of curvature.

6. The airfoil of claim 5, wherein the thermal barrier coating is configured to transition from the first portion to the second portion at an inflection line.

7. The airfoil of claim 1, wherein the diffuser includes an upstream wall, the upstream wall extending from the cooling passage to the outer wall and being characterized by a third radius of curvature, the third radius of curvature being greater than the depth of the cooling passage.

8. The airfoil of claim 7, wherein the thermal barrier coating includes a first portion upstream of the linear ridge, the first portion extending from the cooling passage and being characterized by a first radius of curvature, the first radius of curvature being greater than the third radius of curvature.

9. The airfoil of claim 8, wherein the thermal barrier coating includes a second portion, the second portion extending from the first portion and over the linear ridge and being characterized by a second radius of curvature, the second radius of curvature being less than the first radius of curvature.

10. The airfoil of claim 9, wherein the thermal barrier coating is configured to transition from the first portion to the second portion at an inflection line.

11. The airfoil of claim 10, wherein the first portion of the thermal barrier coating extends into the diffuser a distance equal to about twice the depth of the cooling passage.

12. A component for a gas turbine engine, comprising:
    a cooling passage;
    an outer wall separating a core flow path from the cooling passage;
    a minicore exit aperture in fluid communication with the cooling passage and opening into the core flow path, the minicore exit aperture being characterized by a linear ridge on a downstream end of the minicore exit aperture; and
    a thermal barrier coating covering the outer wall and the linear ridge,
        wherein the linear ridge includes an upstream facing side that is characterized by a height extending a first distance in a direction normal to the outer wall, the height having a value within a range of between five one-hundredths and seventy-five one-hundredths of a depth of the cooling passage, the depth extending between a first wall and a second wall that define the cooling passage and in the direction normal to the outer wall.

13. The component of claim 12, wherein the minicore exit aperture defines a rectangular shape in a direction normal to the outer wall and wherein the linear ridge extends perpendicular to the cooling passage along the downstream end of the minicore exit aperture.

14. The component of claim 13, wherein the thermal barrier coating includes a first portion upstream of the linear ridge, the first portion extending from the cooling passage and being characterized by a first radius of curvature and wherein the thermal barrier coating includes a second portion, the second portion extending from the first portion and over the linear ridge and being characterized by a second radius of curvature.

15. The component of claim 14, wherein the thermal barrier coating is configured to transition from the first portion to the second portion at an inflection line.

16. The component of claim 15, wherein the minicore exit aperture includes an upstream wall, the upstream wall extending from the cooling passage to the outer wall and being characterized by a third radius of curvature, the third radius of curvature being greater than the depth of the cooling passage.

17. The component of claim 16, wherein the first radius of curvature is greater than the third radius of curvature.

18. The component of claim 17, wherein the second radius of curvature is less than the first radius of curvature.

* * * * *